United States Patent
Tsien et al.

(10) Patent No.: US 12,423,006 B2
(45) Date of Patent: Sep. 23, 2025

(54) LOW POWER MEMORY STATE DURING NON-IDLE PROCESSOR STATE

(71) Applicant: Advanced Micro Devices, Inc., Santa Clara, CA (US)

(72) Inventors: Benjamin Tsien, Santa Clara, CA (US); Chintan S. Patel, Austin, TX (US); Guhan Krishnan, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 193 days.

(21) Appl. No.: 18/345,927

(22) Filed: Jun. 30, 2023

(65) Prior Publication Data
US 2025/0004652 A1    Jan. 2, 2025

(51) Int. Cl.
*G06F 3/06*    (2006.01)
*G06F 12/0802*    (2016.01)

(52) U.S. Cl.
CPC .......... *G06F 3/0625* (2013.01); *G06F 3/0634* (2013.01); *G06F 3/0673* (2013.01); *G06F 12/0802* (2013.01)

(58) Field of Classification Search
CPC .... G06F 3/0625; G06F 3/0634; G06F 3/0673; G06F 12/0802; G06F 2212/1028
See application file for complete search history.

(56) References Cited

U.S. PATENT DOCUMENTS

| | | | |
|---|---|---|---|
| 2009/0006813 A1* | 1/2009 | Singhal | G06F 9/383 712/207 |
| 2013/0042126 A1* | 2/2013 | Ganesan | G06F 1/3275 713/324 |
| 2013/0151777 A1 | 6/2013 | Daly et al. | |
| 2016/0203085 A1 | 7/2016 | Kranich et al. | |
| 2019/0065372 A1* | 2/2019 | Roychowdhury | G06F 12/0811 |
| 2019/0146916 A1* | 5/2019 | Matsakis | G06F 12/084 711/130 |
| 2020/0117265 A1 | 4/2020 | Balakrishnan | |
| 2022/0114097 A1 | 4/2022 | Wang et al. | |
| 2023/0197030 A1* | 6/2023 | Konduru | G09G 5/02 345/204 |
| 2024/0069809 A1* | 2/2024 | Betz | G06F 1/3225 |

FOREIGN PATENT DOCUMENTS

KR    10-2016-0033768 A    3/2016

OTHER PUBLICATIONS

International Search Report and Written Opinion from the International Searching Authority from corresponding PCT Application No. PCT/US2024/035906, dated Oct. 25, 2024, (9 pages). By: Authorized Officer: Sung Hee Kim.

* cited by examiner

*Primary Examiner* — Larry T MacKall
(74) *Attorney, Agent, or Firm* — Greenberg Traurig, LLP

(57) ABSTRACT

The disclosed device includes multiple processing component, and a cache. One of the processing components can be instructed to avoid allocating to the cache and another of the processing components can be allowed use the cache while reducing accessing a memory. The memory can then enter a low power state in response to an idle state of the memory from the processing components avoiding accessing the memory for a period of time. Various other methods, systems, and computer-readable media are also disclosed.

20 Claims, 4 Drawing Sheets

LOW POWER MEMORY STATE DURING NON-IDLE PROCESSOR STATE

BACKGROUND

Under certain conditions, such as idle conditions, a processor can enter a low power state (e.g., by shutting off some or all of its components) to reduce power consumption. Similarly, a memory, such as a DRAM, can enter a low power state (e.g., a self-refresh in which data values are read and rewritten in order to refresh weakening charges). The memory low power state is often linked to processor idle states because the memory low power state often requires a period of time when the processor does not access the memory. However, certain architectures can reduce opportunities for the memory to enter the low power memory state.

BRIEF DESCRIPTION OF THE DRAWINGS

The accompanying drawings illustrate a number of exemplary implementations and are a part of the specification. Together with the following description, these drawings demonstrate and explain various principles of the present disclosure.

Figure 1:
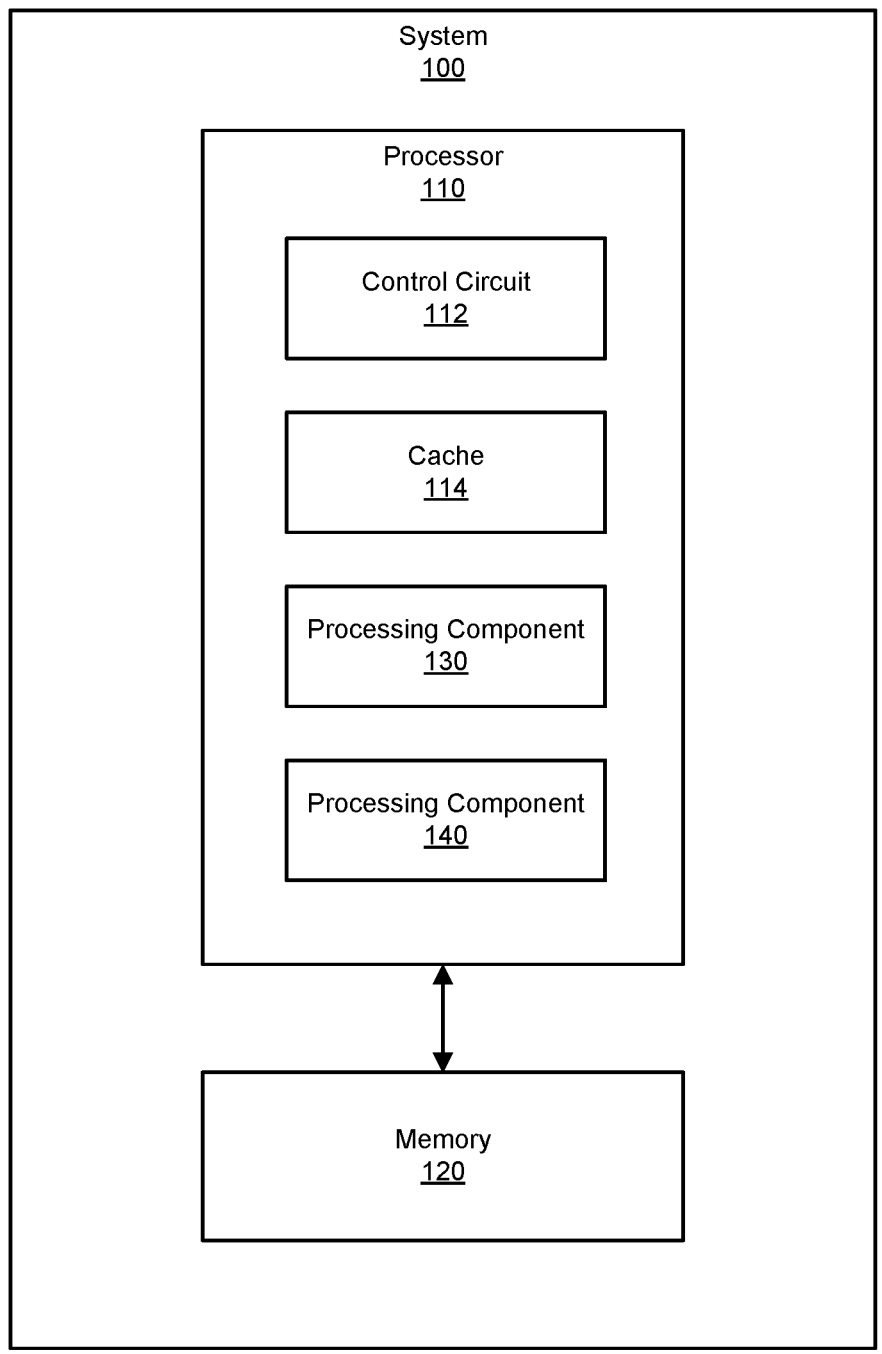
FIG. 1 is a block diagram of an exemplary system for entering a low power memory state during a non-idle processor state.

Throughout the drawings, identical reference characters and descriptions indicate similar, but not necessarily identical, elements. While the exemplary implementations described herein are susceptible to various modifications and alternative forms, specific implementations have been shown by way of example in the drawings and will be described in detail herein. However, the exemplary implementations described herein are not intended to be limited to the particular forms disclosed. Rather, the present disclosure covers all modifications, equivalents, and alternatives falling within the scope of the appended claims.

DETAILED DESCRIPTION

The present disclosure is generally directed to entering a low power memory state during a non-idle processor state. As will be explained in greater detail below, implementations of the present disclosure allow a memory to enter a low power state by instructing a first processing component to avoid accessing a cache, and instructing a second processing component to avoid accessing the memory. The first processing component can have a stutter mode which allows its memory fabric to be temporarily idle (e.g., by exhausting a previously-filled buffer). By having the first processing component avoid the cache, the second processing component can more fully utilize the cache to avoid the memory. During a stutter mode of the first processing component, the memory can enter the low power state even if the second processing component is active, advantageously providing power savings without reducing performance.

In one implementation, a device for entering a low power memory state during a non-idle processor state includes a first processing component, a second processing component, a cache, and a control circuit. The control circuit can be configured to instruct the first processing component to avoid allocating in the cache in response to cache misses, instruct the second processing component to allocate in the cache, and instruct a memory device to enter a low power state in response to an idle state of the memory device.

In some examples, the control circuit is further configured to instruct the first processing component to force evictions from the cache in response to cache hits. The first processing component comprises an activity buffer and is configured to fill the activity buffer to a buffer threshold by accessing the memory device. In some examples, the idle state in the memory device corresponds to the first processing component pausing accesses to the memory device while the activity buffer is exhausted. In some examples, the first processing component corresponds to a display engine and the activity buffer corresponds to a display buffer.

In some examples, the first processing component avoiding allocating to the cache allows the second processing component to allocate a workload of the second processing component in the cache. In some examples, the idle state of the memory device corresponds to the second processing component avoiding accesses to the memory device by having the workload of the second processing component allocated in the cache. In some examples, the idle state of the memory device coincides with an active state of the second processing component. In some examples, the low power state of the memory device corresponds to a self-refresh. In some examples, the control circuit is further configured to instruct the memory device to enter the low power state in response to predicting that the idle state of the memory device has a sufficient idle duration.

In one implementation, a system for entering a low power memory state during a non-idle processor state includes a memory, a processor comprising a cache, a first processing component utilizing an activity buffer, a second processing component, and a control circuit. The control circuit is configured to instruct the first processing component to use the activity buffer and avoid allocating in the cache in response to cache misses and force eviction from the cache in response to cache hits, instruct the second processing component to allocate in the cache, and instruct the memory to enter a low power state while the second processing component is active.

In some examples, the control circuit is further configured to instruct the memory to enter the low power state in response to the memory entering an idle state. In some examples, the control circuit is further configured to instruct the memory device to enter the low power state in response to predicting that the idle state of the memory device has a sufficient idle duration. In some examples, the first processing component is configured to fill the activity buffer to a buffer threshold by accessing the memory, and an idle state of the memory corresponds to the first processing component pausing accesses to the memory while the activity buffer is exhausted. In some examples, the first processing component avoiding allocating to the cache and forcing eviction from the cache allows the second processing component to allocate a workload of the second processing component in the cache. In some examples, the idle state of the memory corresponds to the second processing component avoiding accesses to the memory by having the workload of the second processing component allocated in the cache.

In some examples, the first processing component corresponds to a display engine and the activity buffer corresponds to a display buffer. In some examples, the low power state of the memory corresponds to a self-refresh.

In one implementation, a method for entering a low power memory state during a non-idle processor state includes (i) filling, by a first processing component, an activity buffer of the first processing component and reducing a workload footprint of the first processing component a cache, (ii) avoiding accesses, by the first processing component, to a memory by exhausting the activity buffer, (iii) accessing the cache by a second processing component having its workload in the cache, and (iv) entering a low power state of the memory while the second processing component is active.

In some examples, the method further includes filling the activity buffer to a buffer threshold by accessing the memory. In some examples, entering the low power state of the memory is in response to the memory being idle from the first processing component avoiding accesses to the memory and the second processing component avoiding accesses to the memory. In some examples, the low power state of the memory corresponds to a self-refresh. In some examples, entering the low power state of the memory is in response to predicting the memory to be idle for a sufficient idle duration.

Features from any of the implementations described herein can be used in combination with one another in accordance with the general principles described herein. These and other implementations, features, and advantages will be more fully understood upon reading the following detailed description in conjunction with the accompanying drawings and claims.

The following will provide, with reference to FIGS. 1-4, detailed descriptions of enabling low power states for memory during non-idle or non-low power states for a processor. Detailed descriptions of example systems will be provided in connection with FIGS. 1 and 2. Detailed descriptions of corresponding methods will also be provided in connection with FIGS. 3 and 4.

FIG. 1 is a block diagram of an example system 100 for enabling low power memory states during non-idle processor states. System 100 corresponds to a computing device, such as a desktop computer, a laptop computer, a server, a tablet device, a mobile device, a smartphone, a wearable device, an augmented reality device, a virtual reality device, a network device, and/or an electronic device. As illustrated in FIG. 1, system 100 includes one or more memory devices, such as memory 120. Memory 120 generally represents any type or form of volatile or non-volatile storage device or medium capable of storing data and/or computer-readable instructions. Examples of memory 120 include, without limitation, Random Access Memory (RAM), Read Only Memory (ROM), flash memory, Hard Disk Drives (HDDs), Solid-State Drives (SSDs), optical disk drives, caches, variations, or combinations of one or more of the same, and/or any other suitable storage memory.

As illustrated in FIG. 1, example system 100 includes one or more physical processors, such as processor 110. Processor 110 generally represents any type or form of hardware-implemented processing unit capable of interpreting and/or executing computer-readable instructions. In some examples, processor 110 accesses and/or modifies data and/or instructions stored in memory 120. Examples of processor 110 include, without limitation, chiplets (e.g., smaller and in some examples more specialized processing units that can coordinate as a single chip), microprocessors, microcontrollers, Central Processing Units (CPUs), graphics processing units (GPUs), Field-Programmable Gate Arrays (FPGAs) that implement softcore processors, Application-Specific Integrated Circuits (ASICs), systems on chip (SoCs), digital signal processors (DSPs), Neural Network Engines (NNEs), accelerators, graphics processing units (GPUs), portions of one or more of the same, variations or combinations of one or more of the same, and/or any other suitable physical processor.

As further illustrated in FIG. 1, processor 110 includes a control circuit 112, a cache 114, a processing component 130, and a processing component 140. Control circuit 112 corresponds to circuitry and/or instructions for controlling certain features relating to power management and in some examples includes, is integrated with, and/or otherwise interfaces with a cache controller (e.g., for controlling cache 114) and further in some examples includes, is integrated with, and/or interfaces with a traffic monitor (e.g., for monitoring traffic of memory 120). Cache 114 corresponds to a local storage of processor 110 for holding data such that processor 110 and/or components therein (e.g., processing component 130 and/or processing component 140) can access data without incurring latency of accessing memory 120. In some examples, cache 114 can correspond to a cache hierarchy or portions thereof. Processing component 130 and processing component 140 each correspond to any component of processor 110 that can access data for processing, such as a client of a chiplet. In one implementation, processing component 130 corresponds to a stutter client having an activity buffer (e.g., a component of a chiplet capable of being idle or otherwise not accessing memory while its previously-filled activity buffer is exhausted).

Figure 2:
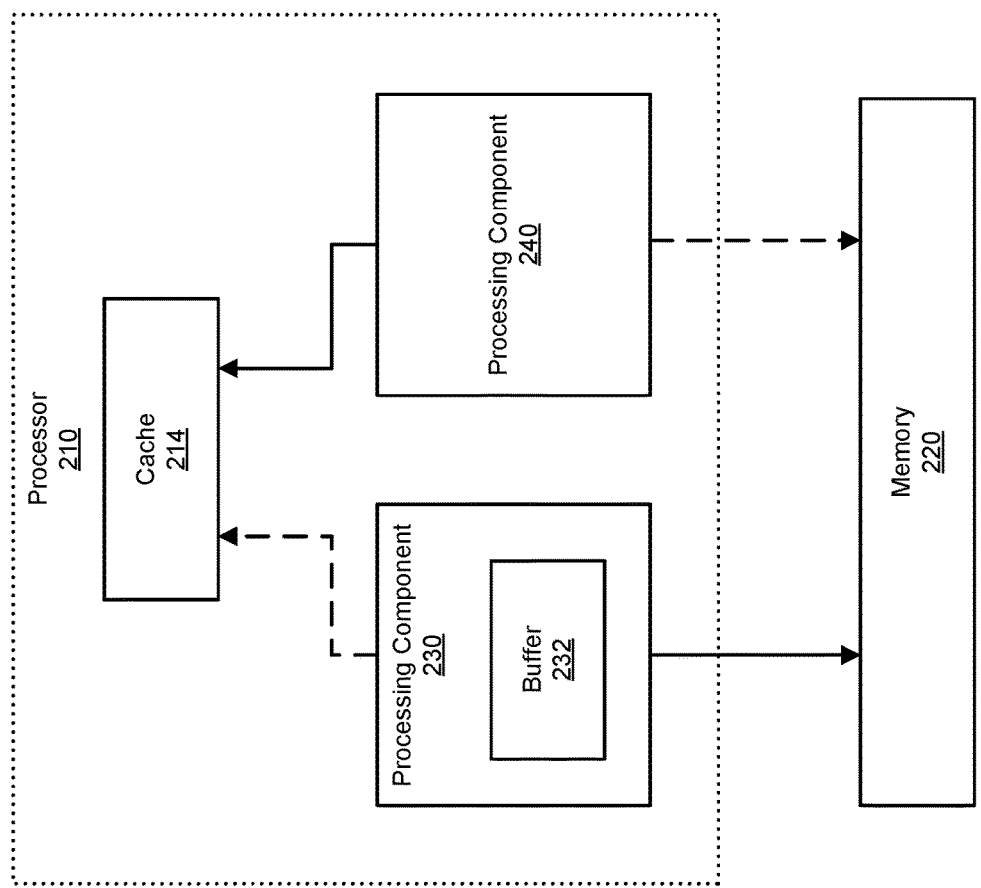
FIG. 2 is a block diagram of another exemplary system for entering a low power memory state during a non-idle processor state.

FIG. 2 illustrates a simplified architecture of a system 200 corresponding to system 100. System 200 includes a processor 210 corresponding to processor 110 and a memory 220 corresponding to memory 120. As further illustrated in FIG. 2, processor 210 includes a cache 214 corresponding to cache 114, a processing component 230 corresponding to processing component 130, and a processing component 240 corresponding to processing component 140. Processing component 230 further includes a buffer 232 that corresponds to an activity buffer for storing data and, when filled to a buffer threshold, allows processing component 230 to stutter.

In some examples, processing component 230 corresponds to a display engine such that buffer 232 corresponds to a display frame buffer. During normal operation, display data (e.g., frames) can be accessed from cache 214 (having been accessed from memory 220 and cached in cache 214 for example upon a cache miss) for buffering in buffer 232. Processing component 240 can also access data from cache 214 that was cached from memory 220 (and accessing memory 220 as needed for example upon a cache miss). However, having the display frame buffer in cache 214 can be inefficient, particularly for a small cache, as the display frame buffer can often be large. For example, a potentially large cache footprint for the display engine can undesirably cause capacity eviction for other processing components (e.g., by occupying a significant portion of cache 214, other processing components can be prevented from allocating to cache 214).

To improve cache utilization, a control circuit (e.g., control circuit 112) can instruct processing component 230 to avoid allocating to cache 214 (as indicated by the dotted arrow) in order to exclude data for buffer 232 (e.g., to exclude the display frame buffer) from cache 214. Processing component 230 can instead access memory 220 (as indicated by the solid arrow) for data to be buffered, and use buffer 232. For coherence reasons, processing component 230 can still access cache 214 (e.g., so as not to read potentially stale data from memory 220 when modified data is available in cache 214), but can further be instructed to force eviction from cache 214 upon hits. In some examples, this force eviction can further evict lines already cached by processing component 230 to avoid such lines being promoted to the most recently used (MRU) location of cache 214, which can continue to occupy cache 214 preventing other processing components from allocation. Thus, processing component 230 can be prevented from capacity evicting other processing components from cache 214. In some examples, processing component 230 can minimally use and/or forego using cache 214.

Processing component 240 can accordingly access/use cache 214 more efficiently (as indicated by the solid arrow), such as using the freed up locations in cache 214 previously used by processing component 230. For example, processing component 240 can allocate into cache 214 to avoid cache misses (which cause memory accesses to memory 220). In some examples, processing component 240 can fit its entire workload (e.g., for at least a period of time) in cache 214 so as to avoid accessing memory 220 (as indicated by the dotted arrow). Memory low power residence can be enhanced with processing component 240 having its entire workload in cache 214. Thus, in some examples, processing component 240 can be selected based on having a workload footprint that potentially fits in cache 214 or can otherwise benefit from cache-as-RAM or cache-as-buffer modes.

This operation further allows a sufficient period of time where there are no accesses to memory 220 (e.g., a sufficient idle duration for memory 220) such that memory 220 can enter a low power state (e.g., a self-refresh). For instance, during the period of time when processing component 240 can operate from cache 214, processing component 230 can stutter by sufficiently filling buffer 232 and avoid (e.g., pause) accessing memory 220 while buffer 232 is exhausted. Thus, even while processor 210 is active or otherwise non-idle or non-low power (e.g., due to at least processing component 240 being active), memory 220 can advantageously enter the low power state such as self-refresh.

In some implementations, the control circuit can monitor traffic for memory 220 to predict whether an idleness interval for memory 220 will meet a desired or sufficient idle duration (e.g., for entering and exiting the low power state) such that the control circuit (and/or power management logic) can decide whether memory 220 should enter the low power state. In some examples, the control circuit can predict based on past history. For instance, the control circuit can classify types of traffic as stutter traffic (e.g., from processing component 230 and/or other processing components capable of stutter) or other traffic (e.g., from processing component 240 and/or other processing components other than stutter-capable components).

The control circuit can analyze the other traffic (e.g., based on the past history) to predict whether the idle state will have the sufficient idle duration. In addition, based on the analysis of the other traffic, analysis of workloads, software and/or driver configurations, etc., the control circuit can also determine effective times for instructing processing component 230 and/or processing component 240 to achieve the sufficient idle duration for memory 220 and proactively enter the low power state for memory 220.

Although the examples herein describe avoiding accesses to memory 220 and/or cache 214 (e.g., allocating to and/or evicting from cache 214), in certain scenarios the components can access memory 220 and/or cache 214 as needed. For example, when buffer 232 is nearly exhausted (e.g., falls below a lower buffer threshold for avoiding a blackout in which no display frames are available to display, which in some examples can account for latency of memory 220 exiting its low power state), processing component 230 can access memory 220 as needed. Processing component 230 can also access cache 214 as needed. In addition, processing component 240 can access memory 220 as needed, for instance for a cache miss with cache 214. As such, memory 220 and the various processing components can enter/exit low power states as needed, including, for example, processor 210 exiting a low power state leading to self-refresh for memory 220, processor 210 going from an active state to a low power state during self-refresh for memory 220, etc. As described herein, instructions to avoid memory 220 and/or cache 214 allow sufficient coinciding periods of idle states of some components (e.g., for processing component 230 and memory 220) with active states of other components (e.g., processing component 240) to allow memory 220 to enter a low power state even when processor 210 is active or is otherwise not in a low power state.

Figure 3:
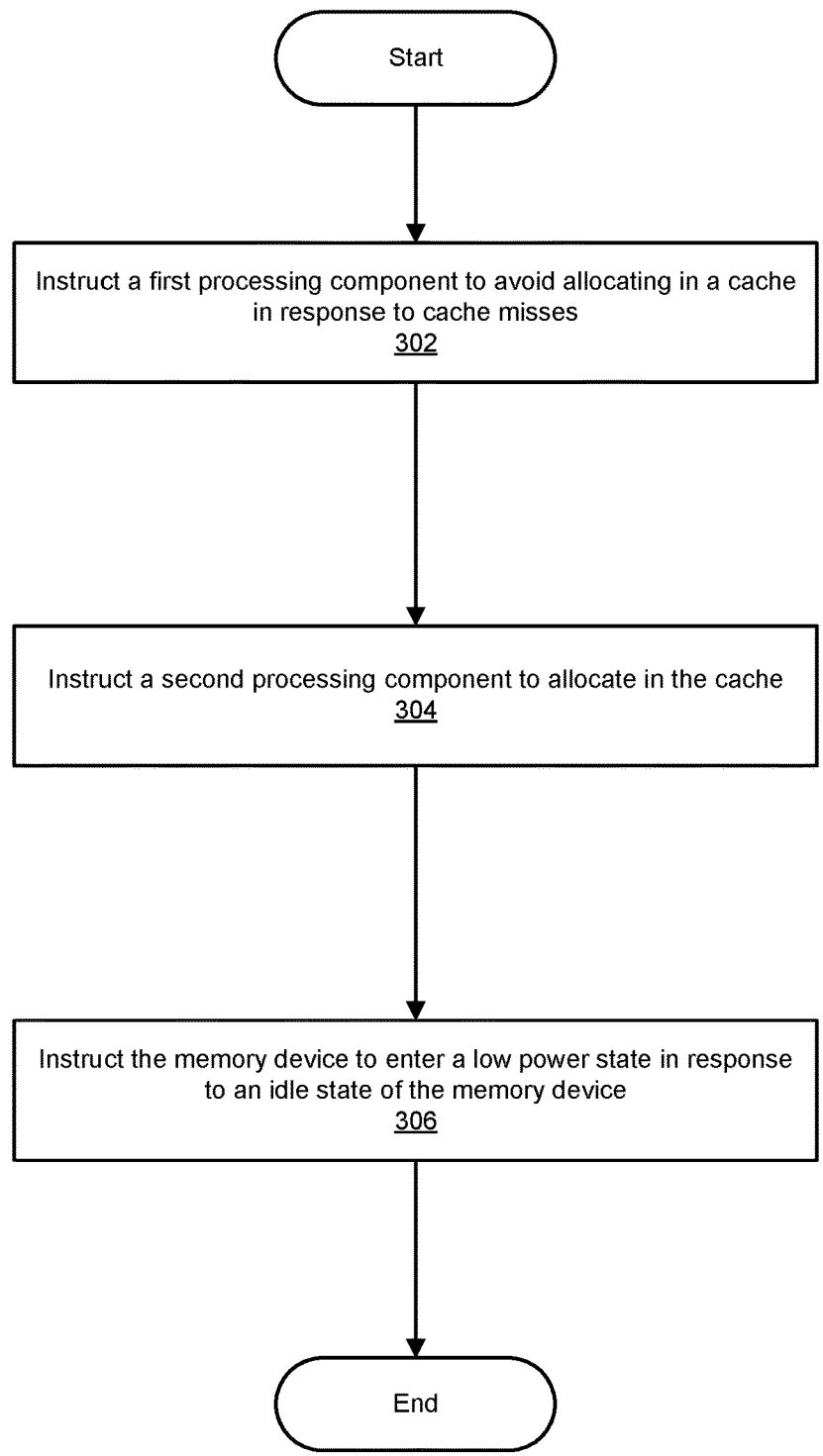
FIG. 3 is a flow diagram of an exemplary method for entering a low power memory state during a non-idle processor state.

FIG. 3 is a flow diagram of an exemplary method 300 for entering a low power memory state during a non-idle processor state. The steps shown in FIG. 3 can be performed by any suitable circuit, device, and/or system, including the system(s) illustrated in FIGS. 1 and/or 2. In one example, each of the steps shown in FIG. 3 represent an algorithm whose structure includes and/or is represented by multiple sub-steps, examples of which will be provided in greater detail below.

As illustrated in FIG. 3, at step 302 one or more of the systems described herein instruct the first processing component to avoid allocating to the cache in response to cache misses. For example, control circuit 112 can instruct processing component 130 to avoid allocating to cache 114 on cache misses.

The systems described herein can perform step 302 in a variety of ways. In one example, control circuit 112 can further instruct processing component 130 to force evictions from cache 114 in response to cache hits. In some examples, the first processing component (e.g., processing component 130 and/or processing component 230) comprises an activity buffer (e.g., buffer 232) and is configured to fill the activity buffer to a buffer threshold by accessing the memory device (e.g., memory 120 and/or memory 220). In some examples, the first processing component corresponds to a display engine and the activity buffer corresponds to a display buffer, although in other examples the first processing component can correspond to other components capable of stuttering (e.g., an image signal processor (ISP), an input/output device capable of periodic isochronous traffic, etc.). In some examples, processing component 130 can further confirm meeting conditions for stuttering.

At step 304 one or more of the systems described herein instruct the second processing component to allocate in the cache. For example, control circuit 112 can instruct processing component 140 to allocate to cache 114 and reduce accessing memory 120 (e.g., by reducing misses). In some examples, processing component 130 avoiding allocating to cache 114 can allow processing component 140 to allocate a workload of processing component 140 to cache 114. In some examples, control circuit 112 can instruct processing component 140 to flush pending writes to memory 120.

As illustrated in FIG. 3, at step 306 one or more of the systems described herein instruct the memory device to enter a low power state in response to an idle state of the memory device. For example, control circuit 112 and/or memory 120 can detect an idle state of memory 120 and accordingly instruct memory 120 to enter a low power state.

The systems described herein can perform step 306 in a variety of ways. In one example, the low power state of the memory device corresponds to a self-refresh. In some examples, wherein the idle state in the memory device corresponds to the first processing component pausing accesses to the memory device while the activity buffer is exhausted. Additionally, in some examples, the idle state of the memory device corresponds to the second processing component avoiding accesses to the memory device by having the workload of the second processing component allocated to the cache. Further, in some examples, the idle state of the memory device coincides with an active state of the second processing component.

Figure 4:
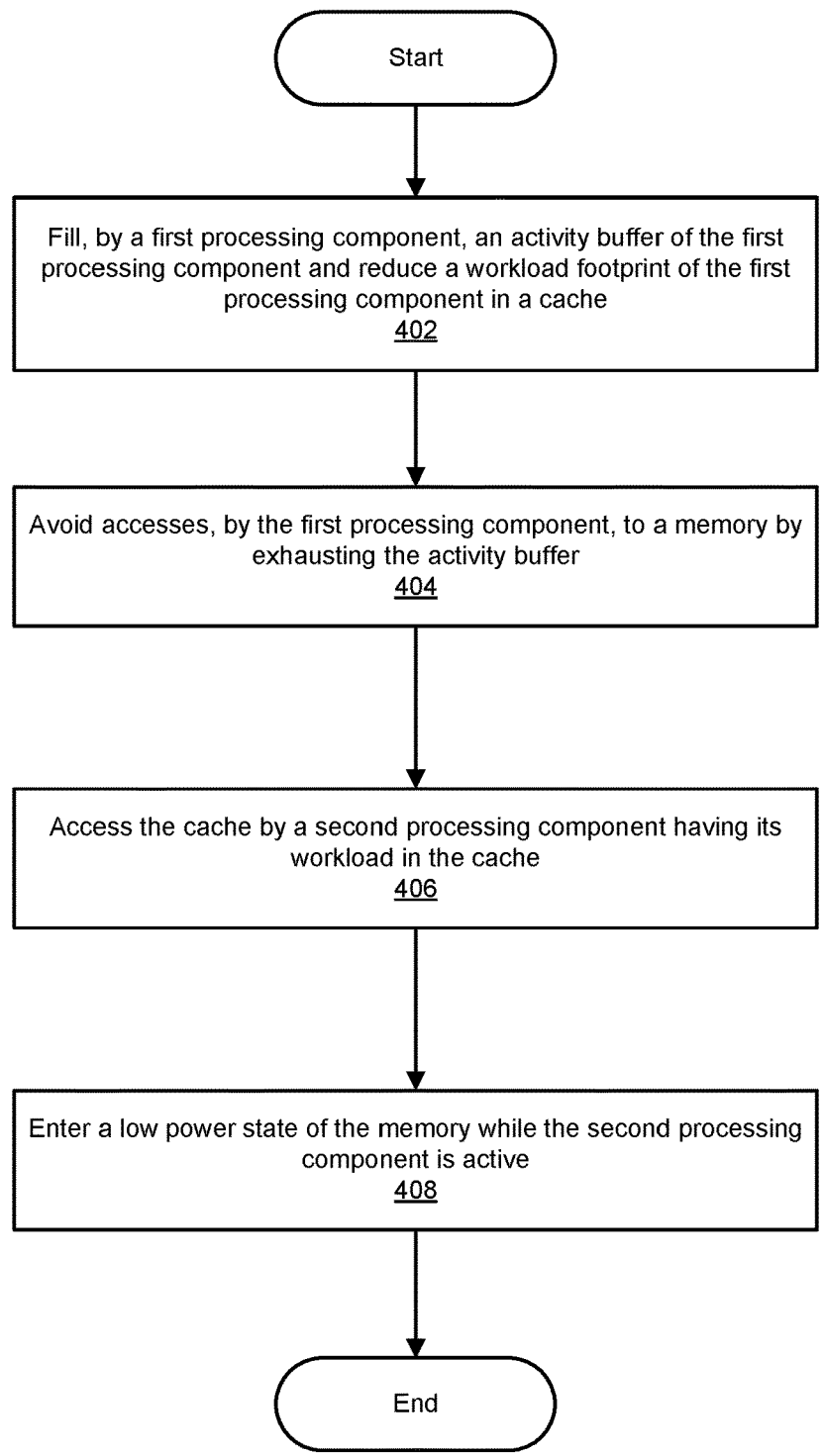
FIG. 4 is a flow diagram of another exemplary method for entering a low power memory state during a non-idle processor state.

FIG. 4 is a flow diagram of an exemplary method 400 for entering a low power memory state during a non-idle processor state. The steps shown in FIG. 4 can be performed by any suitable circuit, device, and/or system, including the system(s) illustrated in FIGS. 1 and/or 2. In one example, each of the steps shown in FIG. 4 represent an algorithm whose structure includes and/or is represented by multiple sub-steps, examples of which will be provided in greater detail below.

As illustrated in FIG. 4, at step 402 one or more of the systems described herein fill, by a first processing component, an activity buffer of the first processing component and reduce a workload footprint of the first processing component in a cache. For example, processing component 130 (or processing component 230) can fill its activity buffer (e.g., buffer 232) and avoid accessing cache 114 (or cache 214).

The systems described herein can perform step 404 in a variety of ways. In one example, filling the activity buffer includes filling the activity buffer to a buffer threshold by accessing the memory, as described herein.

At step 404 one or more of the systems described herein avoid accesses, by the first processing component, to a memory by exhausting the activity buffer. For example, processing component 130 (or processing component 230) can avoid accessing memory 120 (or memory 220).

At step 406 one or more of the systems described herein access the cache by a second processing component having its workload in the cache. For example, processing component 140 accesses cache 114 and avoids accessing memory 120.

At step 408 one or more of the systems described herein enter a low power state of the memory while the second processing component is active. For example, memory 120 can enter a low power state (e.g., self-refresh) while processing component 140 is active.

The systems described herein can perform step 408 in a variety of ways. In one example, entering the low power state of the memory is in response to the memory being idle from the first processing component avoiding accesses to the memory and the second processing component avoiding accesses to the memory. For instance, memory 120 can be idle due, in part, to processing component 130 avoiding accesses to memory 120 as well as processing component 140 avoiding accesses to memory 120. Control circuit 112 can, in some examples, also predict that memory 120 will be idle for a sufficient idle duration for entering and exiting the lower power state. In response to memory 120 being idle, memory 120 can enter the low power state.

As detailed above, in SOCs where a large cache is present, certain workloads, such as battery sensitive workloads, with a small enough footprint can fit entirely in the cache without DRAM misses, or specific software or driver optimizations leveraging cache-as-RAM (CAR), or cache-as-buffer (CAB) modes can intentionally avoid DRAM access such that DRAM can be left in a lower power state or self-refresh. For instance, if the DRAM interface is determined to be idle by a traffic monitor in the cache controller, a data fabric can either proactively enter DRAM self-refresh while not in low power processor state, or exit from low power to restore access to the cache without taking DRAM out of self-refresh.

A DRAM request generated by the cache controller, e.g., on a miss or non-cacheable request, will exit self-refresh on demand, or low power processor state readiness achieved during non-idle processor state self-refresh can lead to conversion to a low power state with DRAM remaining in self-refresh. For example, an operating system (OS) waking up for scheduler checks, audio workloads using cache as RAM, video conferencing, etc., can operate without cache misses, but when mixing with other workloads, such as graphics/display that will have cache misses, will cause the cache to access DRAM. When graphics become active (and DRAM is in self-refresh), a cache miss will cause DRAM to exit self-refresh such that stutter mode is reserved for when the system is idle.

Accordingly, certain clients can operate out of cache, and others, such as stutter clients, are less able to operate out of cache. A stutter client, such as display, can be configured to not use cache, and operate from DRAM. The display client can then be forced to stutter, which along with the other clients operating out of cache, allows DRAM to self-refresh, even when the system is active.

Thus, the systems and methods described herein allow an SOC with a small cache to exclude the display frame buffer, often large, from caching, so that cache can be reserved for other components more in need of cache use, such as hardware save state, scenario based cache-as-RAM use by audio, inference engine, or video decode engine (e.g., for I-frame caching). By excluding display caching, frame buffer access will always go to DRAM, which is facilitated, as described herein, by negotiating display stutter during non-idle or non-low power state in order to create gaps in DRAM traffic so that cached components can continue to hit in the cache with DRAM in self-refresh.

In other words, the systems and methods described herein allows display stutter to occur even when the system is active, because the cache will not necessarily access DRAM, allowing DRAM to sufficiently enter self-refresh. By forcing display to DRAM and not to use cache, the cache can be more efficiently utilized. Because self-refresh is a low power mode for DRAM, power efficiency improves.

As detailed above, the circuits and systems described and/or illustrated herein broadly represent any type or form of computing device or system capable of executing computer-readable instructions. In their most basic configuration, these computing device(s) each include at least one memory device and at least one physical processor.

In some examples, the term "memory device" generally refers to any type or form of volatile or non-volatile storage device or medium capable of storing data and/or computer-readable instructions. In one example, a memory device stores, loads, and/or maintains one or more of the modules and/or circuits described herein. Examples of memory devices include, without limitation, Random Access Memory (RAM), Read Only Memory (ROM), flash memory, Hard Disk Drives (HDDs), Solid-State Drives (SSDs), optical disk drives, caches, variations, or combinations of one or more of the same, or any other suitable storage memory.

In some examples, the term "physical processor" generally refers to any type or form of hardware-implemented processing unit capable of interpreting and/or executing computer-readable instructions. In one example, a physical processor accesses and/or modifies one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), systems on a chip (SoCs), digital signal processors (DSPs), Neural Network Engines (NNEs), accelerators, graphics processing units (GPUs), portions of one or more of the same, variations or combinations of one or more of the same, or any other suitable physical processor.

In some implementations, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein are shown or discussed in a particular order, these steps do not necessarily need to be performed in the order illustrated or discussed. The various exemplary methods described and/or illustrated herein can also omit one or more of the steps described or illustrated herein or include additional steps in addition to those disclosed.

The preceding description has been provided to enable others skilled in the art to best utilize various aspects of the exemplary implementations disclosed herein. This exemplary description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A device comprising:
a first processing component;
a second processing component;
a cache; and
a control circuit configured to:
instruct the first processing component to avoid allocating in the cache in response to cache misses;
instruct the second processing component to allocate in the cache while the first processing component avoids allocating in the cache; and
instruct a memory device to enter a low power state in response to an idle state of the memory device.

2. The device of claim 1, wherein the control circuit is further configured to instruct the first processing component to force evictions from the cache in response to cache hits.

3. The device of claim 1, wherein the first processing component comprises an activity buffer and is configured to fill the activity buffer to a buffer threshold by accessing the memory device.

4. The device of claim 3, wherein the idle state in the memory device corresponds to the first processing component pausing accesses to the memory device while the activity buffer is exhausted.

5. The device of claim 3, wherein the first processing component corresponds to a display engine and the activity buffer corresponds to a display buffer.

6. The device of claim 1, wherein the first processing component avoiding allocating to the cache allows the second processing component to allocate a workload of the second processing component in the cache.

7. The device of claim 6, wherein the idle state of the memory device corresponds to the second processing component avoiding accesses to the memory device by having the workload of the second processing component allocated in the cache.

8. The device of claim 1, wherein the idle state of the memory device coincides with an active state of the second processing component.

9. The device of claim 1, wherein the control circuit is further configured to instruct the memory device to enter the low power state in response to predicting that the idle state of the memory device has a sufficient idle duration.

10. A system comprising:
a memory;
a processor comprising:
a cache;
a first processing component utilizing an activity buffer; and
a second processing component; and
a control circuit configured to:
instruct the first processing component to use the activity buffer and avoid allocating in the cache in response to cache misses and force eviction from the cache in response to cache hits;
instruct the second processing component to allocate in the cache while the first processing component avoids allocating in the cache; and
instruct the memory to enter a low power state while the second processing component is active.

11. The system of claim 10, wherein the control circuit is further configured to instruct the memory to enter the low power state in response to the memory entering an idle state.

12. The system of claim 11, wherein the control circuit is further configured to instruct the memory to enter the low power state in response to predicting that the idle state of the memory has a sufficient idle duration.

13. The system of claim 11, wherein the first processing component is configured to fill the activity buffer to a buffer threshold by accessing the memory, and an idle state of the memory corresponds to the first processing component pausing accesses to the memory while the activity buffer is exhausted.

14. The system of claim 11, wherein the first processing component avoiding allocating to the cache and forcing eviction from the cache allows the second processing component to allocate a workload of the second processing component in the cache.

15. The system of claim 14, wherein the idle state of the memory corresponds to the second processing component avoiding accesses to the memory by having the workload of the second processing component allocated in the cache.

16. The system of claim 10, wherein the first processing component corresponds to a display engine and the activity buffer corresponds to a display buffer.

17. A method comprising:
filling, by a first processing component, an activity buffer of the first processing component and reducing a workload footprint of the first processing component in a cache;
avoiding accesses, by the first processing component, to a memory by exhausting the activity buffer;
accessing the cache by a second processing component having its workload in the cache while the first processing component avoids accesses to the memory; and
entering a low power state of the memory while the second processing component is active.

18. The method of claim 17, further comprising filling the activity buffer to a buffer threshold by accessing the memory.

19. The method of claim 17, wherein entering the low power state of the memory is in response to the memory being idle from the first processing component avoiding accesses to the memory and the second processing component avoiding accesses to the memory.

20. The method of claim 17, wherein entering the low power state of the memory is in response to predicting the memory to be idle for a sufficient idle duration.

* * * * *